United States Patent [19]

Röhm

[11] Patent Number: 4,619,460
[45] Date of Patent: Oct. 28, 1986

[54] HAMMER-DRILL CHUCK

[76] Inventor: Günter H. Röhm, Heinrich-Röhm-Strasse 50, 7927 Sontheim, Fed. Rep. of Germany

[21] Appl. No.: 591,975

[22] Filed: Mar. 21, 1984

[30] Foreign Application Priority Data

Mar. 25, 1983 [DE] Fed. Rep. of Germany ... 8308926[U]
Apr. 29, 1983 [DE] Fed. Rep. of Germany ... 3315661[U]

[51] Int. Cl.$^4$ ............................................. B23B 31/04
[52] U.S. Cl. ...................................... 279/19; 173/133; 279/66
[58] Field of Search ...................... 279/19, 66, 67, 68, 279/87, 89, 76, 19.1, 19.2, 19.3, 19.4; 173/133

[56] References Cited

U.S. PATENT DOCUMENTS

| 1,840,767 | 1/1932 | Cross | 279/67 |
| 1,873,476 | 8/1932 | Procunier | 279/67 |
| 2,089,230 | 8/1937 | Thowless | 279/55 |
| 4,519,621 | 5/1985 | Okamoto | 279/116 |

FOREIGN PATENT DOCUMENTS

| 29968 | 6/1981 | European Pat. Off. | 279/19 |
| G8132988 | 1/1983 | Fed. Rep. of Germany . | |
| 3133085 | 3/1983 | Fed. Rep. of Germany . | |
| 2030485 | 4/1980 | United Kingdom . | |

Primary Examiner—Gil Weidenfeld
Assistant Examiner—Daniel W. Howell
Attorney, Agent, or Firm—Karl F. Ross; Herbert Dubno

[57] ABSTRACT

A chuck is used with a hammer drill having a drive spindle rotatable about a spindle axis and a hammer displaceable axially in the drive spindle, and with a drill bit having a shaft extending along a shaft axis and having a radially outwardly open and at least generally axially extending groove. The chuck has a generally tubular chuck body centered on a chuck axis and having a central axially extending passage. This body is normally carried on the spindle and receives the shaft of the drill bit in its passage with the spindle, shaft, and chuck axes all coaxial. The hammer projects axially forward into the passage and is engageable therein with the bit. A plurality of jaws radially but not angularly displaceable in the chuck body have inner ends engageable with the drill-bit shaft and in turn provided with formations complementarily engageable in the groove thereof. An actuator is connected to the jaws for moving same radially synchronously and thereby centering the bit in the body by engagement of the inner ends with the shaft and for engaging the formations in the grooves for rotationally linking the body and bit while permitting limited relative axial movement.

10 Claims, 18 Drawing Figures

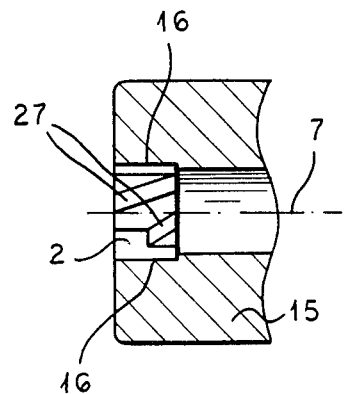
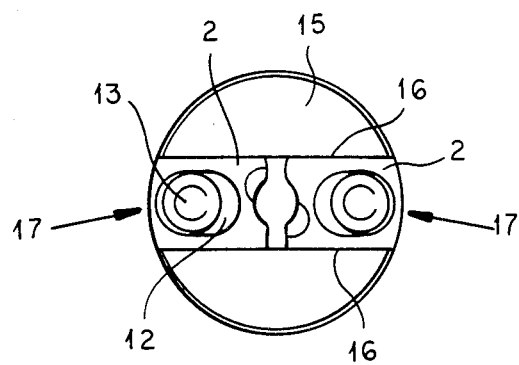
FIG.3      FIG.2
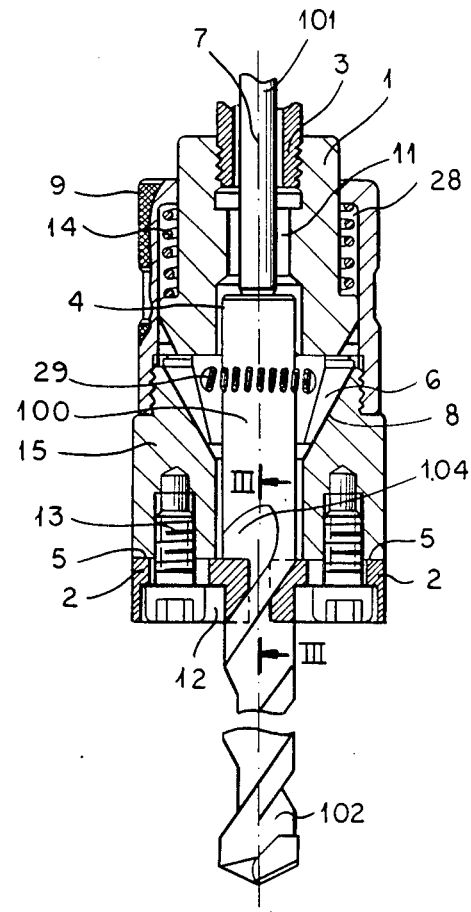
FIG.1

HAMMER-DRILL CHUCK

FIELD OF THE INVENTION

The present invention relates to a drill chuck. More particularly this invention concerns a chuck for a hammer drill.

BACKGROUND OF THE INVENTION

A standard hammer drill has a drive spindle that is rotated about a spindle axis and a hammer displaceable axially in the drive spindle. A chuck is carried on the spindle so as to rotate therewith, and holds a drill bit having a shaft having a radially outwardly open and at least generally axially extending groove. The chuck holds the drill bit so it is centered on the spindle axis, and the hammer is effective on the rear end of the drill bit. The bit is rotationally coupled to the chuck body, which as mentioned above is rotated, and is at least limitedly axially reciprocated by the hammer so that it can drill through masonry or the like.

A light-duty hammer drill normally has a simple Jacobs chuck comprising a chuck body comprised of one part formed with a frustoconical surface centered on the chuck axis and another part axially displaceable relative thereto and forming an abutment surface generally perpendicular to the chuck axis. Three angularly equispaced jaws are axially braced between the centering and abutment surfaces and are urged radially apart by springs. The two parts are threaded together so the surfaces can be axially relatively displaced, thereby radially displacing the jaws. To hold a bit, the parts are relatively rotated to separate the surfaces and spread the jaws, the shank of the bit is placed between the spread jaws, and the parts are oppositely relatively rotated to clamp the jaws on the shank of the bit.

Such an arrangement axially couples the bit to the chuck so that the hammering is not highly effective. Accordingly German patent document 3,133,085 filed Aug. 21, 1981 by the instant applicant proposes a chuck where the jaws that rotationally couple the bit and chuck body are mounted in a core that can move limitedly axially on the chuck body, while of course being rotationally coupled thereto. The coupling jaws of such an arrangement can bite into and imbed themselves in the cylindrical drill shaank, damaging the bit and making it difficult to remove from the chuck. If they bite in, their grip actually will loosen, so that the bit will slip and be damaged. Once the shank of a bit is damaged in this manner, it becomes difficult or impossible to chuck it on center.

German utility model 8,132,988 filed Nov. 11, 1981 by Hilti describes a drill bit formed with axially elongated and radially outwardly open grooves. Special formations on the chuck can engage in them, while permitting relative axial movement, to transmit torque from the chuck body to the drill bit. This type of chuck cannot, however, be used with a conventional bit, only with special grooved ones, a distinct disadvantage since most hammer drills allow the hammering to be canceled for use as a standard purely rotary drill.

OBJECTS OF THE INVENTION

It is therefore an object of the present invention to provide an improved hammer-drill chuck.

Another object is the provision of such a hammer-drill chuck which overcomes the above-given disadvantages, that is which can be used with special-style grooved masonry bits as well as with standard bits, and that will surely hold the bits it is being used with without damaging them.

SUMMARY OF THE INVENTION

The chuck according to this invention is used with a hammer drill having a drive spindle rotatable about a spindle axis and a hammer displaceable axially in the drive spindle, and with a drill bit having a shaft extending along a shaft axis and having a radially outwardly open and at least generally axially extending groove. The chuck has a generally tubular chuck body centered on a chuck axis and having a central axially extending passage. This body is normally carried on the spindle and receives the shaft of the drill bit in its passage with the spindle, shaft, and chuck axes all coaxial. The hammer projects axially forward into the passage and is engageable therein with the bit. A plurality of jaws radially but not angularly displaceable in the chuck body have inner ends engageable with the drill-bit shaft and in turn provided with formations complementarily engageable in the groove thereof. An actuator is connected to the jaws for moving same radially synchronously and thereby centering the bit in the body by engagement of the inner ends with the shaft and for engaging the formations in the grooves for rotationally linking the body and bit while permitting limited relative axial movement.

With such a chuck the drill bit is securely held against rotation relative to the chuck body, while still being at least limitedly axially displaceable therein. The rotational coupling is extremely robust while still not substantially inhibiting axial movement of the bit.

According to this invention at least three such jaws each have both an inner end having a part-cylindrical centering surface engageable with the shaft adjacent the respective groove and a tooth constituting the formation and engageable in the respective groove. This is the simplest possible embodiment. The grooves according to this invention can extend axially with the formations correspondingly extending axially, or the grooves can be chip-shedding flutes that extend helically on the shaft and the formations extend correspondingly helically.

According to another of this invention the actuator includes a ring centered on the chuck axis and rotatable thereabout on the chuck body. This ring is formed with an axially open spiral ridge and the jaws are formed with axially extending teeth meshing with the ridge. Thus rotation of the ring radially displaces the jaws. Such a chuck can also have a spring-loaded ratchet system engaged between the ring and the chuck body for releasably retaining the ring thereon in any of a plurality of angularly offset positions. This ratchet unit includes an array of angularly offset recesses formed in the chuck body, a ball radially displaceable in the ring and engageable in the recesses, and a spring urging the ball from the ring into the recesses.

The chuck according to this invention can also have a locking device engageable between the chuck body and the ring for angularly arresting the ring on the chuck body. Such a locking device can include an element rotatable on the chuck body about an axis generally perpendicular to the chuck axis and having an eccentric outer surface engageable with the ring. This element is rotatable about its axis between a position with its outer surface bearing against the ring and thereby arresting it and a position with its outer surface spaced from the ring and permitting same to rotate about the chuck axis. The ring can also be formed with axially open teeth engageable and operable by a chuck key. All of these systems allow relatively fast and convenient operation of the chuck.

Instead of a single set of jaws fulfilling both coupling and centering functions, the chuck according to this invention can have at least three centering jaws having the inner ends which in turn have substantially part cylindrical inner-end surfaces and a plurality of coupling jaws axially offset from the centering jaws and displaceable independently thereof. These coupling jaws have the formations engageable in the grooves and the centering jaws and the coupling jaws have respective centering and coupling actuators.

It is possible according to this invention for both actuators include a ring centered on the chuck axis, rotatable thereabout on the chuck body, and formed with an axially open spiral ridge. As in the arrangement described above, the jaws are formed with axially extending teeth meshing with the ridge so that rotation of the ring radially displaces the respective jaws.

The chuck body of this invention can also have a generally frustoconical centering surface centered on the chuck axis with the centering jaws being wedge-shaped and axially and radially slidable on the centering surface. The centering actuator includes springs urging the centering jaws radially inward. In addition the chuck body includes one part formed with the centering surface and another part axially displaceable relative thereto and forming an abutment surface generally perpendicular to the chuck axis with the centering jaws axially braced between the centering and abutment surfaces. The centering actuator includes a set of springs braced between the jaws and urging the centering jaws radially outward and the surfaces axially apart with a relatively small force, and another spring braced between the two chuck-body parts and urging same axially together with a relatively great force. Thus the great force can be overcome by manual axial separation of the two parts to spread the centering jaws. Such a chuck is extremely easy to load.

The chuck body according to this invention can also have a generally frustoconical centering surface centered on the chuck axis with the coupling jaws being wedge-shaped and axially and radially slidable on the centering surface. The coupling actuator includes a sleeve threaded on the chuck body and forming an abutment surface generally perpendicular to the chuck axis with the coupling jaws axially braced between the coupling and abutment surfaces. Rotation of the sleeve on the body in one rotational sense displaces the coupling jaws radially inward and opposite rotation allows them to move radially apart. In this case the chuck body can be formed with respective grooves receiving the coupling jaws and having bases together defining the frustoconical surface. The coupling actuator includes springs urging the coupling jaws angularly apart.

The coupling jaws of this invention can also be pivoted on the chuck body about respective axes lying offset from and in a plane perpendicular to the chuck axis and each has an inner portion having the respective formation and engageable in the respective groove and an outer portion normally projecting generally radially from the respective pivot axis and from the chuck axis. The coupling actuator includes a sleeve threaded on the chuck body and forming an abument surface generally perpendicular to the chuck axis and engaging the outer arms of the coupling jaws. Rotation of the sleeve on the body in one rotational sense pivots the coupling jaws radially inward and opposite rotation pivots them outward.

In yet another system of this invention the coupling jaws are radially slidable on the chuck body and the actuator includes respective screws threaded axially into the chuck body through the coupling jaws and tightenable to arrest same on the chuck body.

DESCRIPTION OF THE DRAWING

The above and other features and advantages will become more readily apparent from the following, reference being made to the accompanying drawing in which:

FIG. 1 is an axial section through a drill chuck, drill bit, and drill spindle according to the present invention;

FIG. 2 is an end view taken looking up in FIG. 1, with the drill bit removed for clarity of view;

FIG. 3 is a section taken along axial plane III—III of FIG. 1;

SPECIFIC DESCRIPTION

Figure 6:
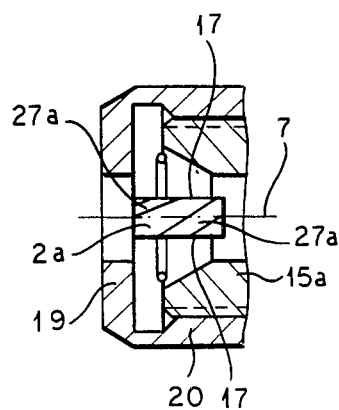
FIGS. 5 and 6 are sections taken along respective planes V—V and VI—VI of FIG. 4.

As seen in FIGS. 1, 2, and 3, a chuck according to this invention has a rear tubular body part 1 centered on an axis 7 and screwed at its rear end onto a threaded spindle 3 of a hammer drill. This spindle 3 can be rotated about the axis 7 and is tubular so a hammer rod 101 can extend axially through it, projecting into a rear passage portion 11 in the body part 1. This body part 1 carries a separate front part 15 that is also tubular and that cannot rotate relative to the part 1. A knurled sleeve 9 threaded onto the part 15 and extending back over the part 1 is splined to this part 1. A helical compression spring 14 received in a compartment 28 is engaged between the sleeve 9 and a shoulder of the part 1 to pull the front body part 15 axially back against the rear body part 1.

A plurality of wedge-shaped jaws 6 engage against a frustoconical and axially backwardly flared surface 8 of the body part 1 and have rear surfaces lying in a plane perpendicular to the axis 7 and butting flatly against the front face of the part 1. Compression springs 29 engaged angularly between adjacent sides of the jaws 6 urge them radially apart with a force, however, insufficient to overcome that of the spring 14 which, in pulling the front body part 15 axially back toward the rear part 1, thereby wedges the jaws 6 radially inward toward the axis 7.

A carbide-tipped masonry drill bit 102 has a cylindrical shank 100 extending back into a front passage section 4 of the body 1 and is formed with two standard chip-shedding helical flutes 104. This shank 100 is received with all-around radial play in the passage section 4, and is engaged radially by the wedges 6 which will automatically center the bit 102 on the axis 7. In order to fit the shank 100 into the chuck, therefore, the sleeve 9 is pushed forward to allow the springs 29 to spread the jaws 6 and provide sufficient clearance. These jaws 6 serve principally to guide and center the tool 102 in the chuck body 1, 15, they do not have any major function rotationally linking the bit 102 to the body 1, 15.

The front face of the front body part 15 is formed with a pair of diametrally aligned radial slots 16 in which respective radially slidable stops or abutments 2 are provided. Socket-type cap screws 13 are screwed axially into the body part 15 and have heads received in recesses 12 of the stops 2 and extending through radial slots 5 in them. These screws 13 can therefore be tightened to secure these stops 2 in any of a plurality of radially offset positions.

The radially inner ends of the stops 2 have formations 27 constituted as helically extending teeth that fit complementarily into the flutes 104 of the bit 102 to rotationally couple this bit 102 to the body 1, 15, while still however permitting limited axial displacement of the bit 102 relative to the body 1, 15.

Thus in use the spindle 3 rotates and the stops 2 rotationally entrain the bit 102 for standard drilling action. In addition the hammer rod 101 reciprocates axially slightly, hammering the rear end of the bit 102 and displacing it axially slightly. Since the flutes 104 are helical such slight axial movement also of course slightly rotates the bit 102, but this extra rotation is nominal compared to the rotation caused by the spindle 3, so that it is merely reflected as slight increases followed by slight decreases in overall rotations speed.

The chuck of FIG. 1 normally requires that one of the screws 13 be loosened to fit a new bit 102 into the body 1, 15. Once in place the loosened stop 2 is snugged up in the respective flute 104 and drilling can begin.

Figure 5:
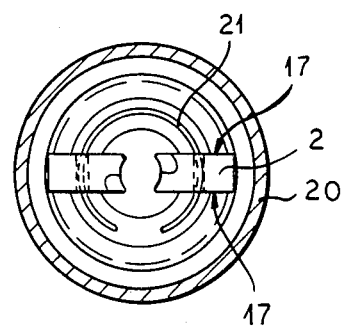
Figure 4:
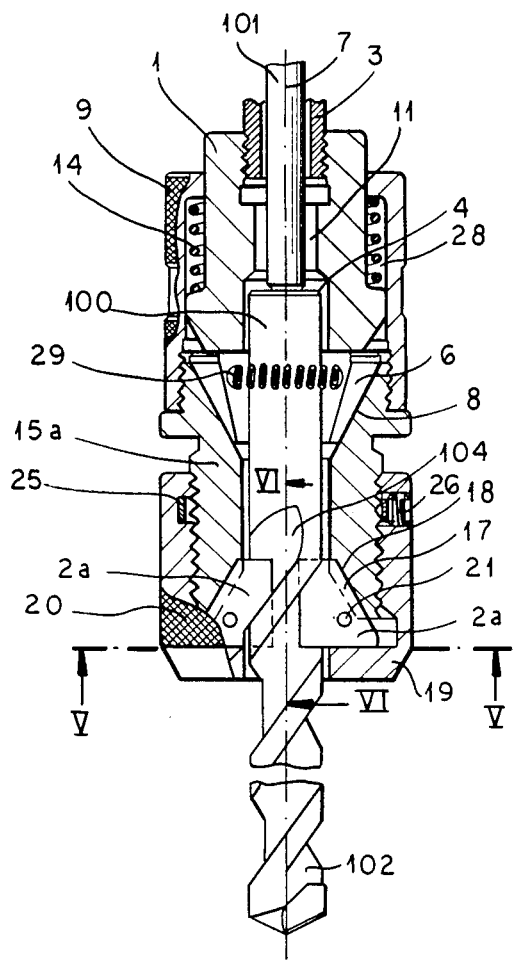
FIG. 4 is an axial section through a second drill-chuck assembly according to the present invention.

In the embodiment of FIGS. 4, 5, and 6 parts structurally identical to those of FIG. 1 bear the same reference characters, and parts functionally but not structurally identical bear the same reference characters with a postscript "a". This embodiment is identical to that of FIG. 1, except for the manner in which the bit 102 is rotationally linked to the body 1, 15a.

The stops 2a here are formed as jaws riding, opposite to the jaws 6, on 21 in slots 17 formed in the front body part 15a and having bases 18 lying on a frustoconical surface centered on the axis 7 and flared forward. An adjustment sleeve 20 is threaded on the front part 15a and has a rim 19 that can engage axially backward against the front faces of these jaws 2a to press them backward and, due to the wedging action of the inclined grooves 17, radially inward. The radial inner faces of the jaws 2a are formed with teeth 27a complementary to the flutes 104 for good angular force transmission from the body 1, 15a to the bit 102.

Thus with this arrangement a new bit is fitted into the chuck by first screwing the sleeve 20 axially forward, that is away from the spindle 3, to allow the springs 21 to push the jaws 2a radially apart, and then the sleeve 9 is pushed forward to similarly spread the jaws 6. The bit 102 is then inserted and the sleeve 9 released to center the bit 102 and grip it between the jaws 6. The sleeve 20 is then screwed back down to engage the jaws 2a snugly but not tightly in the flutes 104.

A locking ring 25 and screw 26 are provided to rotationally arrest the sleeve 20 in any position on the front part 15a, thereby avoiding loosening of these parts during heavy drilling.

Figure 9:
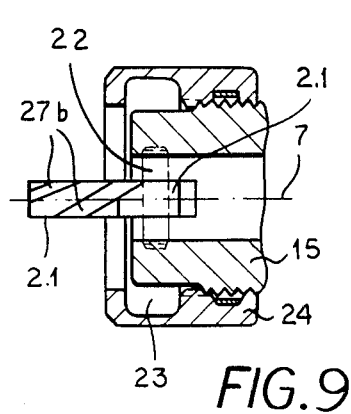
FIG. 9 is a section taken along axial plane IX—IX of FIG. 7.
Figure 8:
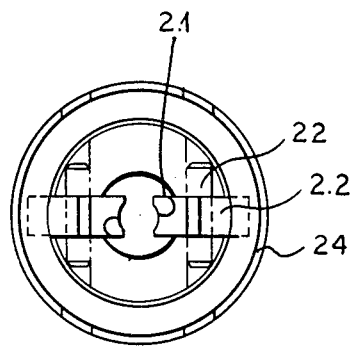
FIG. 8 is an end view taken looking up in FIG. 7, with the drill bit removed for clarity of view.
Figure 7:
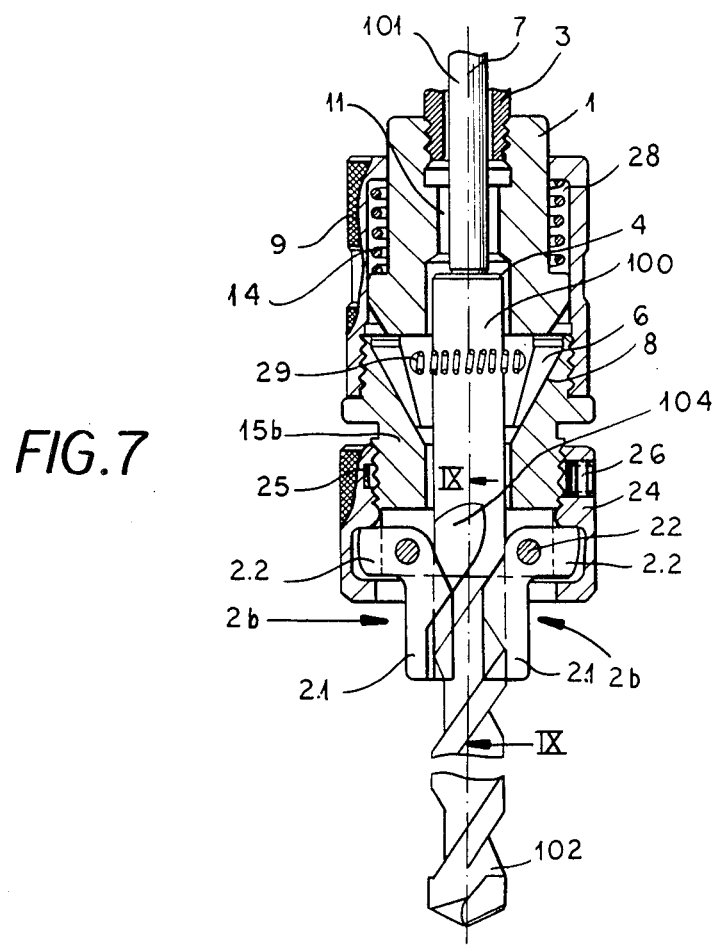
FIG. 7 is an axial section through a third drill-chuck assembly according to the present invention.

In the embodiment of FIGS. 7, 8, and 9 parts structurally identical to those of FIG. 1 bear the same reference characters, and parts functionally but not structurally identical bear the same reference characters with a postscript "b". This embodiment is similar to that of FIG. 2.

The stops 2b here are two-arm levers pivoted at tangential pivot pins 22 on the front body part 15b, with one arm 2.1 having the formations 27b that fit the flute 104 and another arm 2.2. A sleeve 24 is threaded on the front body part 15b and is formed with an inwardly open groove 23 in which the arms 2.2 are received. Screwing this sleeve 24 forward on the body 1, 15b will therefore pivot the arms 2.1 into position engaging in the flutes 104.

The embodiment of FIGS. 10 and 11 is once again identical to that of FIG. 1 with respect to the centering-jaw mechanism. Parts structurally identical to those of FIG. 1 bear the same reference characters, and parts functionally but not structurally identical bear the same reference characters with a postscript "c".

The stop jaws 2c here are radially slidable in passages 17c in the front body part. They are formed along their axial rear edges with teeth 112 that mesh with a spiral tooth-and-groove formation 111 of a two-part adjustment ring 110 rotatable on the body. A knurled adjustment sleeve 113 secures the two halves of the ring 110 together and facilitates rotating it. When rotated in one sense it radially inwardly advances the stops 2 to push the formations 27c into the flutes 104, and when oppositely rotated it radially outwardly withdraws them.

Like the embodiment of FIGS. 7–9, in this arrangement the jaws 2c are backed off by appropriate rotation of the sleeve 113, the sleeve 0 is pushed forward to spread the jaws 6, and the bit 102 can be inserted into the passage 4, whereupon the sleeve 9 is released to center and then the sleeve 113 is rotated to push the stops 2c in.

Figure 11:
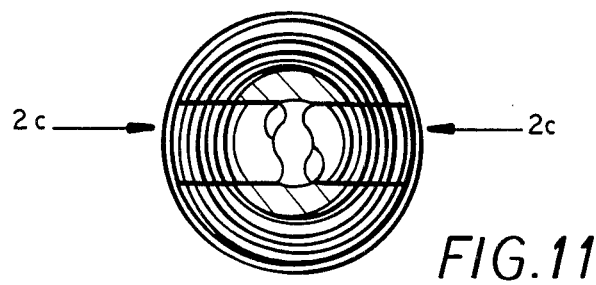
FIG. 11 is a section taken along axial plane XI—XI of FIG. 10.
Figure 14:
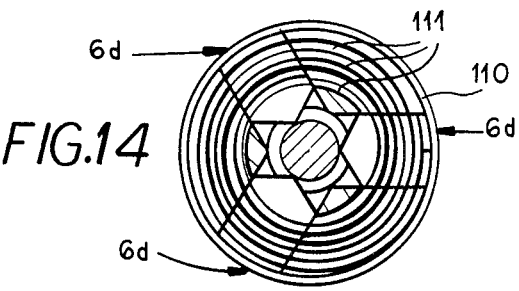
FIGS. 13 and 14 are sections taken along respective lines XIII—XIII and XIV—XIV of FIG. 12.
Figure 12:
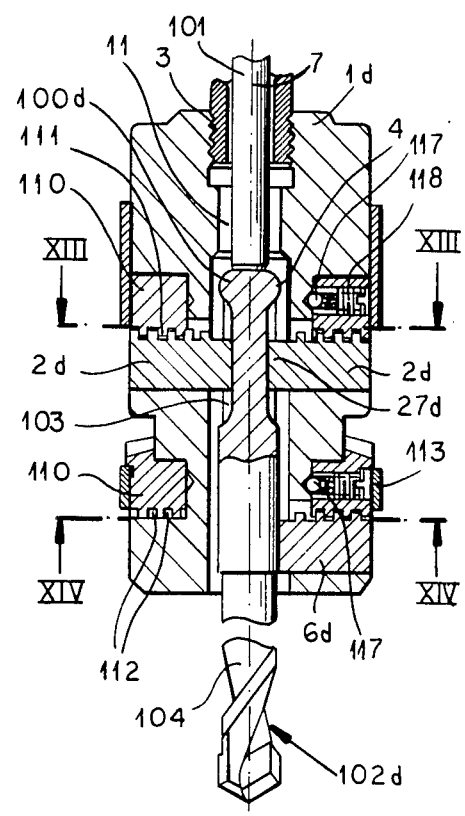
FIG. 12 is an axial section through a fifth drill-chuck assembly according to the present invention.
Figure 13:
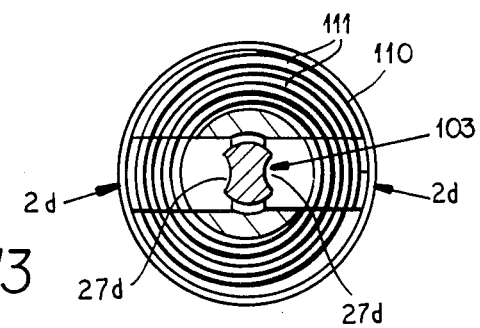

In the embodiment of FIGS. 12, 13, and 14 parts functionally identical to those of FIG. 1 bear the same reference characters with a postscript "d" and parts structurally and functionally identical to other parts described above bear the respective reference characters. This arrangement uses a system like that of FIGS. 10 and 11 for the stops 2d and for the centering jaws 6c.

Figure 10:
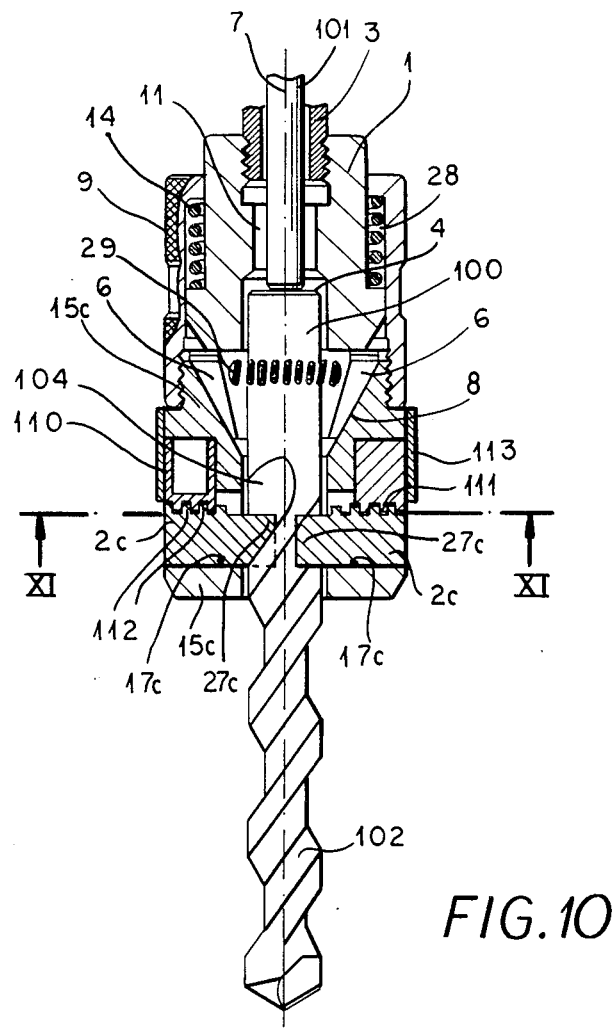
FIG. 10 is an axial section through a fourth drill-chuck assembly according to the present invention.

The bit 102d here has a pair of diametrally opposite and perfectly axially extending grooves 103 on its shank 100d that are used for rotationally entraining it, rather than its chip-shedding flutes 104. Since these grooves 103 are provided at the rear end of the shank 100d, the jaws 2d, which function identically to the jaws 2c of FIGS. 10 and 11, are provided between the centering jaws 6d and the spindle 3. In this arrangement the teeth 27d of the coupling jaws 2d fit within the grooves 103 as shown in FIG. 13, and against the cylindrical outer surface of the tool shank 100d. The complementary fit ensures perfect centering of the bit 102d.

There are three centering jaws 6d, as visible from FIG. 14 that are angularly equispaced about the axis 7 and that have part-cylindrical inner ends that can complementarily engage around the cylindrical portion of the shank 100d slightly ahead of the grooves 103. These jaws 6d have teeth 112 that engage with a helical advance ridge 111 of the ring 110 of the same construction described above with reference to FIGS. 10 and 11, that is of two-part construction and held together by a ring 113.

In this arrangement both rings 110 are formed with a radially throughgoing passage provided with a ball 117 bearing via a compression spring on an abutment screw 118. These balls 117 can fit in any of a multiplicity of radially outwardly open recesses formed in the body 1d. In this manner the rings 110 are held in place so that vibration or the like will not accidentally rotate them.

Figure 15:
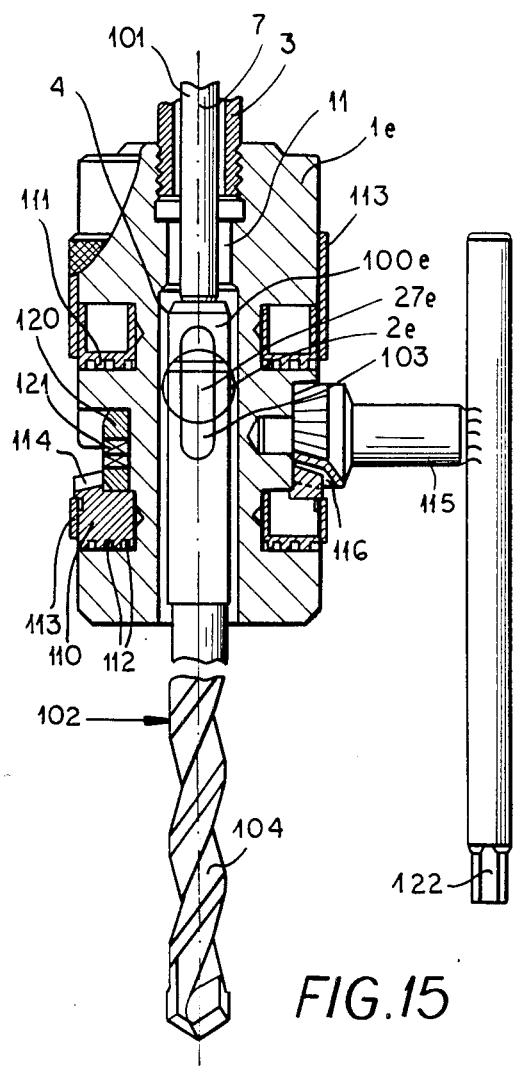
FIGS. 15, 16 and 17 are axial sections through sixth, seventh, and eighth drill chucks according to the invention.

The arrangement of FIG. 15 is substantially identical to that of FIGS. 12, 13, and 14. Here, however, the rings 110 are both formed with teeth 114 that can mesh with teeth 116 of a standard chuck key 115 that can be fitted into the side of the chuck body 1e. This allows some force to be applied to the not-illustrated jaws 6d, permitting some angular force transmission with them.

In addition in this arrangement an eccentric locking disk 120 pivoted on the body 1e about an axis perpendicular to the axis 7 can be rotated by fitting a hex end 122 of the key 115 into a central hole 121 in it so as to bear axially on the ring 110 of the centering jaws and thereby lock it in place. The jaws 23, however, need not be too tight, so that they can be advanced to fit their ends 27e into the grooves 103 simply by manually grasping the knurled ring 113 and rotating it.

Figure 16:
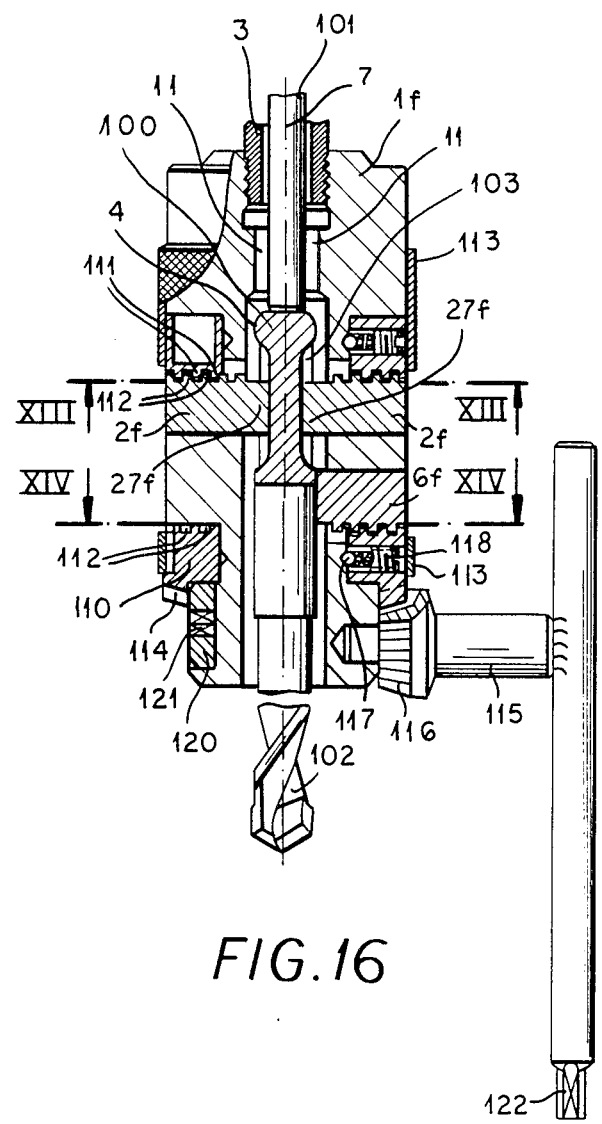

In FIG. 16 the arrangement is, once again, substantially identical to that of FIGS. 12–14 and 15, with identical reference characters for structurally identical parts and the same characters with a postscript "f", in the same methodology as above and below, for functionally identical parts. In this assembly the chuck key 115 is fitted into the chuck body 1f axially forward of the ring 110 for the centering jaws 6f, and the locking ring 121 is also provided forward of this ring 110. In addition both rings 110 are provided with ratcheting balls 117.

Figure 18:
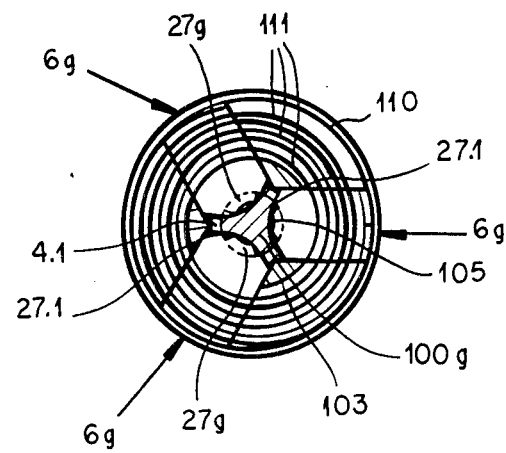
FIG. 18 is a section taken along line XVIII—XVIII of FIG. 17.
Figure 17:
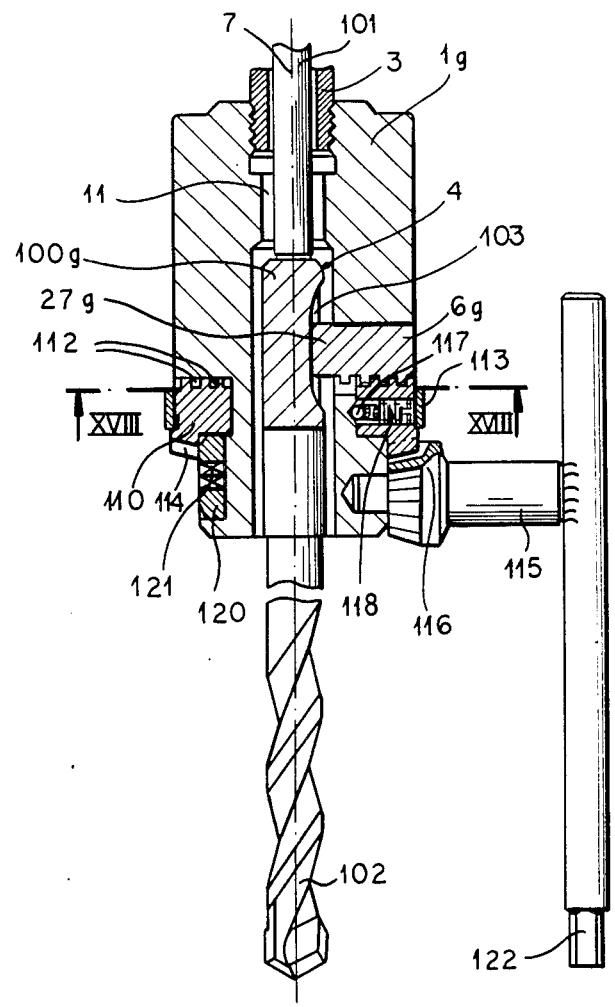

Finally, FIGS. 17 and 18 show the simplest embodiment of the present invention. Here the tool 102g is formed with axial grooves 103 in its rear end or shank 100g and centering stops 6g are provided that have the formations 27g that engage in these grooves 103 to center the tool 102g, and lateral centering and guide formations 27.1 that permit the tool 102g to move axially. The formations 27.1 also have part-cylindrical end faces 105 centered on the axis and destined to engage and center ungrooved drill shanks. The jaws 6g are separated angularly by spaces 4.1, as they have quite some range of adjustment.

I claim:
1. In combination with
   a hammer drill having a drive spindle rotatable about a spindle axis and a hammer displaceable axially in the drive spindle; and
   a drill bit having a shaft extending along a shaft axis and having a plurality of radially outwardly open and at least generally axially extending grooves, a chuck comprising:
   a generally tubular chuck body centered on a chuck axis and having a central axially extending passage, the body normally being fixed on the spindle against movement angularly, axially, or radially relative thereto and spacedly receiving the shaft of the drill bit in its passage with the spindle, shaft, and chuck axes all coaxial, the hammer projecting axially forward into the passage and being engageable therein with the bit;
   a plurality of centering jaws radially but not angularly or axially displaceable in the chuck body and having inner ends radially engageable with the drill-bit shaft offset from the grooves;
   a plurality of coupling jaws radially but not angularly or axially displaceable in the chuck body and axially offset from the centering jaws, the coupling jaws having formations complementarily engageable in the grooves of the drill bit; and
   respective guiding and coupling actuating means connected to the jaws for moving same radially synchronously and thereby centering the bit in the body by engagement of the inner ends of the centering jaws with the shaft and for engaging the formations of the coupling jaws in the grooves for rotationally linking the body and bit while permitting limited relative axial movement between the bit and the body.

2. The drill chuck defined in claim 1 wherein the grooves extend axially and the formations correspondingly extend axially.

3. The drill chuck defined in claim 1 wherein at least one of the actuating means includes a ring centered on the chuck axis and rotatable thereabout on the chuck body, the ring being formed with an axially open spiral ridge and the respective jaws being formed with axially extending teeth meshing with the ridge, whereby rotation of the ring radially displaces the respective jaws.

4. The drill chuck defined in claim 3, further comprising
   spring-loaded ratchet means engaged between the ring and the chuck body for releasably retaining the ring thereon in any of a plurality of angularly offset positions.

5. The drill chuck defined in claim 4 wherein the ratchet means includes an array of angularly offset recesses formed in the chuck body, a ball radially displaceable in the ring and engageable in the recesses, and a spring urging the ball from the ring into the recesses.

6. The drill chuck defined in claim 3, further comprising
   locking means engageable between the chuck body and the ring for angularly arresting the ring on the chuck body.

7. The drill chuck defined in claim 3 wherein the ring is formed with axially open teeth engageable and operable by a chuck key.

8. The drill chuck defined in claim 1 wherein both actuating means include a ring centered on the chuck axis, rotatable thereabout on the chuck body, and formed with an axially open spiral ridge, the jaws being formed with axially extending teeth meshing with the ridge, whereby rotation of the ring radially displaces the respective jaws.

9. In combination with
   a hammer drill having a drive spindle rotatable about a spindle axis and a hammer displaceable axially in the drive spindle; and
   a drill bit having a shaft extending along a shaft axis and having a plurality of radially outwardly open and at least generally axially extending grooves, a chuck comprising:
   a generally tubular chuck body centered on a chuck axis and having a central axially extending passage, the body normally being carried on the spindle and receiving the shaft of the drill bit in its passage with the spindle, shaft, and chuck axes all coaxial, the hammer projecting axially forward into the passage and being engageable therein with the bit;

a plurality of centered jaws radially but not angularly displaceable in the chuck body and having inner ends engageable with the drill-bit shaft;

a plurality of coupling jaws radially but not angularly displaceable in the chuck body and axially offset from the centering jaws, the coupling jaws having formations complementarily engageable in the grooves of the drill bit;

respective guiding and coupling actuating means connected to the jaws for moving same radially synchronously and thereby centering the bit in the body by engagement of the inner ends of the centering jaws with the shaft and for engaging the formations of the coupling jaws in the grooves for rotationally linking the body and bit while permitting limited relative axial movement, at least one of the actuating means including a ring centered on the chuck axis and rotatable thereabout on the chuck body, the ring being formed with an axially open spiral ridge and the respective jaws being formed with axially extending teeth meshing with the ridge, whereby rotation of the ring radially displaces the respective jaws; and locking means engageable between the chuck body and the ring for angularly arresting the ring on the chuck body, the locking means including an element rotatable on the chuck body about an axis generally perpendicular to the chuck axis and having an eccentric outer surface engageable with the ring, the locking element being rotatable about its axis between a position with its outer surface bearing against the ring and thereby arresting it and a position with its outer surface spaced from the ring and permitting same to rotate about the chuck axis.

10. The drill chuck defined in claim 1 wherein the coupling jaws have an axial length substantially shorter than that of the respective grooves, whereby the jaws can move axially in the grooves while still rotationally coupling the body to the bit.

* * * * *